United States Patent [19]

Cheung et al.

[11] Patent Number: 4,981,631
[45] Date of Patent: Jan. 1, 1991

[54] PROCESS FOR MAKING LIGHTWEIGHT POLYESTER ARTICLES

[75] Inventors: Tak M. Cheung, Akron; Charles L. Davis, Stow; Jack E. Prince, N. Canton, all of Ohio

[73] Assignee: The Goodyear Tire & Rubber Company, Akron, Ohio

[21] Appl. No.: 331,140

[22] Filed: Mar. 31, 1989

[51] Int. Cl.$^5$ .................. B29C 51/02; B29C 67/20
[52] U.S. Cl. .......................................... 264/50; 264/85; 264/553; 264/171; 264/211; 264/211.21; 264/321; 264/322; 425/4C
[58] Field of Search ............... 264/50, 48, 45.9, 46.1, 264/321, 53, 322, 85, 171, 211.21, 320, 211, 553; 425/4 C, 817 C

[56] References Cited

U.S. PATENT DOCUMENTS

| | | | |
|---|---|---|---|
| 3,374,300 | 3/1968 | Azuma | 425/4 C |
| 3,651,181 | 3/1972 | Ramaika | 264/48 |
| 4,405,400 | 9/1983 | Petersen-Hoj | 264/45.9 |
| 4,426,065 | 1/1984 | Komatsuzaki et al. | 264/45.9 |
| 4,466,933 | 8/1984 | Huggard | 264/321 |

FOREIGN PATENT DOCUMENTS 1129600 8/1982 Canada .......................... 264/45.9
142361 6/1980 German Democratic Rep. ..................................... 264/46.1

Primary Examiner—Jeffery Thurlow
Attorney, Agent, or Firm—Alvin T. Rockhill

[57] ABSTRACT

This invention relates to a process for making a lightweight article which involves the steps of: (1) feeding a thermoplastic resin composition into an extruder, wherein the thermoplastic resin composition contains (a) from about 94 to about 99 weight percent polyethylene terephthalate, and (b) from about 1 to about 6 weight percent of at least one polyolefin; (2) mixing an inert gas into the thermoplastic resin composition in the extruder while the thermoplastic resin composition is in the molten state; (3) extruding the thermoplastic resin composition containing the inert gas through a sheet forming die to produce a substantially amorphous cellular sheet which contains a sufficient amount of inert gas cells to provide the cellular sheet with a density which is within the range of about 0.4 to about 1.25; and (4) thermoforming the cellular sheet in a heated mold to produce the lightweight article. Dual-ovenable trays and other types of food containers can be made utilizing the process of this invention. It is advantageous to utilize the process of this invention in making such articles because they are lightweight and can be made utilizing less polymeric materials.

19 Claims, No Drawings

PROCESS FOR MAKING LIGHTWEIGHT POLYESTER ARTICLES

BACKGROUND OF THE INVENTION

Food containers which are made of polymeric materials are now being used in a wide variety of applications. Foamed polystyrene is widely used in making hot drink cups. It is also used in making "clam shells" which are used by the fast food industry as packages for hamburgers and other types of sandwiches. Unfortunately, there are certain drawbacks associated with such foamed polystyrene containers. For instance, there is currently a great deal of concern about the foaming agents used in making such polystyrene containers destroying the ozone layer of the atmosphere. There is also a growing concern about the safety of using foamed polystyrene food containers due to possible migration of residual styrene. The migration of residual styrene into food products is of particular concern when the container is reheated, such as by a microwave oven.

The wide spread popularity of microwave ovens for home use has initiated interest in food trays which can be used in either microwave ovens or convection ovens. Such food trays must be able to withstand oven temperatures which approach 200° C. Such trays are of particular value as containers for frozen prepared foods. It is accordingly necessary for such trays to have good impact strength and dimensional stability at both freezer and oven temperatures. It is, of course, also important for such trays to be capable of withstanding rapid heating from freezer temperatures of about −30° C. to oven temperatures of about 175° C. or even higher.

Containers which are capable of being heated in either convection ovens or microwave ovens are sometimes described as being dual-ovenable. Polyesters are highly suitable for use in making such dual-ovenable containers. However, it is important for the polyester to be in the crystalline state rather than the amorphous state in order to achieve satisfactory high temperature stability. Normally, polyesters will undergo crystallization by heat treatment at elevated temperatures and the crystallites formed will remain substantially stable up to near the melting point of the polyester. As a general rule, dual-ovenable containers which are comprised of polyester will be heat treated to attain a crystallinity of higher than about 25%.

Injection molding and thermoforming are widely known methods for forming thermoplastic polyester articles. In injection molding, the polyester is heated above its melting point and injected under sufficient pressure to force the molten polyester to fill the mold cavity. The molten polyester is cooled in the mold until it is rigid enough to be removed. The injection molding of a polyester composition containing 0.5% to 10% by weight isotactic polybutene-1 is described in U.S. Pat. No. 3,839,499. However, the injection molding method is generally not satisfactory for the production of thin walled articles, such as dual-ovenable trays, due to flow lines and layering which develop during the filling of the mold which lead to non-uniform properties, surface irregularities, and warping of the finished article.

Thermoforming is another process which is used commercially in the production of polyester articles. It is a particularly valuable technique for use in producing thin walled articles, such as dual-ovenable food trays, on a commercial basis. In thermoforming, a sheet of preformed polyester is preheated to a temperature sufficient to allow the deformation of the sheet. The sheet is then made to conform to the contours of a mold by such means as vacuum assist, air pressure assist, or matched mold assist. The thermoformed article produced is normally heat treated in the mold in order to attain a crystallinity of at least about 25%.

Crystallization rates can generally be improved by including a small amount of a nucleating agent in polyester compositions. For example, U.S. Pat. No. 3,960,807 discloses a process for thermoforming articles from a polyester composition which is comprised of (1) a crystallizable polyester, (2) a crack stopping agent, preferably a polyolefin, and (3) a nucleating agent. Polyester articles which are made utilizing such compositions generally have improved mold release characteristics and improved impact strength. Additionally, the utilization of such modified polyester compositions results in faster thermoforming cycle times due to the faster rate of crystallization which is attained.

U.S. Pat. No. 4,572,852 discloses a polyester molding composition which consists of (1) polyethylene terephthalate, (2) a polyolefin containing from 2 to 6 carbon atoms, and (3) an effective amount of a heat stabilizer. Thin walled thermoformed articles which are prepared utilizing such compositions exhibit improved impact strength and high temperature stability. For this reason dual-ovenable trays which are comprised of polyester/polyolefin blends are widely utilized commercially. Polyethylene terephthalate having an intrinsic viscosity of at least about 0.65 is widely utilized in such applications. It is necessary for the polyethylene terephthalate used in dual-ovenable trays to have an intrinsic viscosity of at least about 0.65 dl/g in order for the article to have sufficient impact strength at low temperatures, such as those experienced in a freezer.

SUMMARY OF THE INVENTION

It has been found that cellular polyester articles made in accordance with this invention can be used in applications that foamed polystyrene currently dominates, such as in hot drink cups and clam shells. Such cellular polyester containers are light weight, provide excellent thermal insulation properties, and are not plagued by environmental or health concerns. Additionally, such cellular polyester articles can be made so as to be dual-ovenable. In fact, cellular dual-ovenable trays having reduced densities can be made which exhibit improved thermal insulating properties over dual-ovenable trays which are made utilizing solid (unblown) polyester. Such cellular dual-ovenable trays also maintain dimensional stability to temperatures as high as about 200° C. which is as good as that obtained utilizing solid polyester. It requires less polymer to manufacture such cellular dual-ovenable trays and they offer an advantage in that they are light weight.

The present invention specifically discloses a process for making a lightweight thin walled article which comprises: thermoforming a substantially amorphous cellular sheet which is comprised of (a) from about 94 to about 99 weight percent polyethylene terephthalate, (b) from about 1 to about 6 weight percent of at least one polyolefin, and (c) a sufficient amount of inert gas cells to provide the cellular sheet with a density which is within the range of about 0.4 to about 1.25. In most cases the thermoforming is carried out in a heated mold for a time which is sufficient to achieve a crystallinity in said article which is within the range of about 5% to about 45%.

The subject invention also reveals a process for making an amorphous cellular sheet which can be thermoformed into lightweight thin walled articles which comprises: (1) feeding a thermoplastic resin composition into an extruder: wherein the thermoplastic resin composition is comprised of (a) from about 94 to about 99 weight percent polyethylene terephthalate, and (b) from about 1 to about 6 weight percent of at least one polyolefin: (2) mixing an inert gas into the thermoplastic resin composition while the thermoplastic resin composition is in the molten state: and (3) extruding the thermoplastic resin composition containing the inert gas through a sheet forming die to produce a substantially amorphous cellular sheet which contains a sufficient amount of inert gas cells to provide the cellular sheet with a density which is within the range of about 0.4 to about 1.25.

The present invention specifically relates to a process for making a lightweight article which comprises: (1) feeding a thermoplastic resin composition into an extruder, wherein the thermoplastic resin composition is comprised of (a) from about 94 to about 99 weight percent polyethylene terephthalate, and (b) from about 1 to about 6 weight percent of at least one polyolefin: (2) mixing an inert gas into the thermoplastic resin composition in the extruder while the thermoplastic resin composition is in the molten state: (3) extruding the thermoplastic resin composition containing the inert gas through a sheet forming die to produce a substantially amorphous cellular sheet which contains a sufficient amount of inert gas cells to provide the cellular sheet with a density which is within the range of about 0.6 to about 1.25; and (4) thermoforming the cellular sheet in a heated mold to produce the lightweight article.

DETAILED DESCRIPTION OF THE INVENTION

The thermoplastic resin compositions utilized in the process of this invention are comprised of polyethylene terephthalate (PET) and at least one polyolefin. Such compositions will normally contain from 94 to 99 weight percent PET and from 1 to 6 weight percent polyolefin. It is generally preferred for the thermoplastic resin compositions of this invention to contain from 96 to 98 weight percent PET and from 2 to 4 weight percent polyolefin with the most preferred compositions containing from about 2.5 to about 3.5 weight percent polyolefin and from about 96.5 to about 97.5 weight percent PET.

PET is comprised of repeat units which are derived from a terephthalic acid or a diester thereof and ethylene glycol. The PET utilized in the thermoplastic resin compositions of this invention can be a modified PET. Such modified PET can contain small amounts of repeat units which are derived from diacids other than terephthalic acid and/or glycols in addition to ethylene glycol. For instance, small amounts of isophthalic acid or a naphthalene dicarboxylic acid can be used in the diacid component utilized in preparing the PET. PET which has been modified with a small amount of a diol containing from 3 to 8 carbon atoms is also representative of a modified PET which can be used. For instance, a small amount of 1,4-butane diol can be utilized in the glycol component used in preparing the modified PET. Normally, no more than about 5 weight percent of the repeat units in such modified PET will be comprised of diacids or diols other than terephthalic acid and ethylene glycol. It is, of course, contemplated that diesters of such dicarboxylic acids and diols can also be used. In most cases, such modified PET will contain less than about 3% diacids other than terephthalic acid and less than 3% diols other than ethylene glycol. It will normally be preferred for such modified polyesters to contain only about 1% dicarboxylic acids other than terephthalic acid and/or less than 1% glycols other than ethylene glycol. In any case polyethylene terephthalate homopolymer is an excellent choice for utilization in the thermoplastic resin compositions of this invention.

The PET utilized in the thermoplastic resin compositions of this invention will normally have an intrinsic viscosity (I.V.) of at least 0.7 dl/g. In most cases, the PET will have an I.V. which is within the range of about 0.8 dl/g to about 1.4 dl/g. It is generally preferred for the PET to have an intrinsic viscosity of at least 0.9 dl/g with it being more preferred for the PET to have an intrinsic viscosity of about 0.95 dl/g. Intrinsic viscosity is defined as the limit of the fraction ln (v)/C as C, the concentration of the polymer solution, approaches 0, wherein v is the relative viscosity which is measured at several different concentrations in a 60/40 mixed solvent of phenol and tetrachloroethane at 30° C.

The polyolefin component of the thermoplastic resin composition is comprised of at least one olefin containing from 2 to about 6 carbon atoms. Such polyolefins are comprised of repeat units which are derived from the olefin monomers. These repeat units differ from the olefin monomers from which they were derived in that they no longer contain a carbon-carbon double bond. Such polyolefins include low density polyethylene, linear low density polyethylene, high density polyethylene, polypropylene, polyisopropylene, polybutene, polypentene, and polymethylpentene. Polyethylene and polypropylene are preferred as polyolefins for utilization in the thermoplastic resin compositions. Linear low density polyethylene is a particularly preferred polyolefin. Linear low density polyethylene which is suitable for use in the practice of this invention is sold by Dow Chemical under the tradename Dowlex TM 2045 and Dowlex TM 2035 Quantum Chemical also sells a suitable linear low density 20 polyethylene under the tradename Petrothane TM PA80077.

Modified polyolefins can also be utilized in accordance with this invention. For instance, polyolefin ionomers can be utilized as the polyolefin component of the thermoplastic resin composition. Polyethylene ionomers are a particularly preferred class of modified polyolefins.

The polyethylene ionomers which can be utilized in the practice of this invention are generally copolymers of ethylene and at least one $\alpha$, $\beta$-ethylenically unsaturated carboxylic acid wherein from about 5 percent to about 90 percent of the carboxylic acid groups are ionized by neutralization with metal ions. The $\alpha$, $\beta$-ethylenically unsaturated carboxylic acid can be a monocarboxylic acid, or have more than one carboxylic group attached to it. The carboxylic acid groups are neutralized with at least one cation from the group consisting of metallic cations having a valence of 1 to 3. The polyethylene ionomers used in this invention will have a melt flow index as measured using ASTM method D-1238 after being dried for 16 hours in a vacuum oven at 63° C. of less than about 2 g/10 minutes. It is preferred for the polyethylene ionomer to have a melt flow index of less than about 1.5 g/10 minutes with it being most preferred for the polyethylene ionomer to have a melt flow index of less than about 1.2 g/10 minutes.

The α, β-ethylenically unsaturated carboxylic acids which can be copolymerized with the ethylene monomer preferably have 3 to 8 carbon atoms. Examples of such acids include acrylic acid, methacrylic acid, ethacrylic acid, itaconic acid, maleic acid, fumaric acid and monoesters of other dicarboxylic acids, such as methyl hydrogen maleate, methyl hydrogen fumarate, ethyl hydrogen fumarate, and maleic anhydride, which is considered to behave like an acid and be an acid in the present invention.

The polyethylene ionomer will generally contain from about 2 to about 40 weight percent α, β-ethylenically unsaturated carboxylic acids and from about 60 to about 98 weight percent ethylene. The polyethylene ionomer will more typically contain from about 3 to about 20 weight percent α, β-ethylenically unsaturated carboxylic acids and from about 80 to about 97 weight percent ethylene.

A preferred polyethylene ionomer is a copolymer of ethylene and an α, β-ethylenically unsaturated monocarboxylic acid having 3 to 6 carbon atoms. A most preferred α, β-ethylenically unsaturated monocarboxylic acid is acrylic acid. Methacrylic acid is another highly preferred α, β-ethylenically unsaturated monocarboxylic acid. The polyethylene ionomer will normally have an acid number in the range from about 1 to about 180, with an acid number from about 40 to 160 being preferred, and an acid number from about 40 to 120 being most preferred. The acid number is determined by the number of milligrams of potassium hydroxide necessary to neutralize one gram of copolymer acid.

The polyethylene ionomers used in this invention will typically have an impact strength as measured at 23° C. using ASTM Method D-1822S of at least 1100 KJ/m$^2$. It is preferred for the polyethylene ionomer to have an impact strength of at least 1150 KJ/m$^2$ with it being most preferred for the polyethylene ionomer to have an impact strength of at least 1200 KJ/m$^2$.

U.S. Pat. No. 4,248,990, which is incorporated herein by reference, discloses polyethylene ionomers and a process for making polyethylene ionomers in greater detail. Polyethylene ionomers which can be used in the practice of this invention are commercially available from E. I. du Pont de Nemours & Company, Inc. and are sold under the tradename Surlyn ®. For example, Surlyn ® 1605 is a polyethylene ionomer which contains approximately 10% acrylic acid and approximately 5% sodium acrylate. Surlyn ® 9721 is a polyethylene ionomer which contains ethylene and methacrylic acid.

The thermoplastic resin composition of this invention will preferably contain one or more heat stabilizers. The inclusion of one or more heat stabilizers has particular utility when the finished article being made from the resin will be subjected to high service temperature conditions for long periods of time. The retention of adequate physical properties, especially impact strength, is very important in applications such as food trays for use in dual-ovenable applications. Heat stabilizers as used herein are compounds which demonstrate antioxidant properties, the most important of which is the capacity of inhibiting oxidation. An effective heat stabilizer in the practice of this invention must be capable of protecting the thermoformed article during exposure to elevated temperatures. The following compounds are representative examples of useful heat stabilizers which can be incorporated into the thermoplastic resin compositions of this invention: alkylated substituted phenols, bisphenols, thiobisacrylates, aromatic amines, organic phosphites, and polyphosphites. The particular aromatic amines which demonstrate specific heat stabilizing capabilities include: primary polyamines, diarylamines, bisdiarylamines, alkylated diarylamines, ketone-diarylamine condensation products, aldehyde-amine condensation products, and aldehyde imines. Conditions which would be considered severe would be those in which the thermoformed article would be exposed to temperatures near 200° C. for periods exceeding about 30 minutes. Preferred heat stabilizers for such severe high temperature applications, particularly where any staining or discoloration from the heat stabilizer is undesirable, are the polyphenols which contain more than two phenol ring structures. Some representative examples of suitable polyphenols include tetrakis(methylene-3(3,5-di-t-butyl-4-hydroxy phenyl)proprionate)methane and 1,3,5-trimethyl-2,4,6-tris(3,5-di-t-butyl-4-hydroxybenzyl)benzene.

Persons skilled in the art will be able to easily ascertain the effective amount of heat stabilizer needed, with this amount generally being within the range of about 0.003% to about 1% by weight based upon the total weight of the thermoplastic resin composition. It will normally be preferred for the amount of heat stabilizer utilized to be within the range of 0.009% to 0.021% by weight, based upon the total weight of the thermoplastic resin composition. It is generally preferred for the heat stabilizer to be mixed with the polyolefin prior to mixing with the polyethylene terephthalate. In such cases, it is preferred to blend about 0.3 to about 0.7 weight percent of the heat stabilizer into the polyolefin, based upon the weight of the polyolefin. The amount of heat stabilizer used will vary with such factors as the degree of protection required, the severity of heat exposure, solubility limitations of the heat stabilizer chosen in the thermoplastic resin composition, and the overall effectiveness of the heat stabilizer.

One or more pigments or colorants can also be added to the thermoplastic resin composition in order to provide it with a desired color. For instance, titanium dioxide can be included in the thermoplastic resin composition in order to provide it with a brilliant white color. Fine inorganic compound particles, such as calcium carbonate, titanium dioxide, finely ground mica, or powdered hydrous magnesium silicate (talc) can be added to provide a better dispersion of inert gas for better cellular uniformity. One or more colorants can also be added to the thermoplastic resin composition in order to provide it with any of a multitude of colors. Such colorants will normally not act as nucleating agents. Some representative examples of non-nucleating organic colorants include: phthalocyanine blue, solvent red 135, and disperse yellow 64 (CAS No. 10319-14-9). Many other dyes of the solvent and disperse groups are also useful for coloring the thermoplastic resin compositions of this invention. The amount of colorant or combination of colorants needed to obtain a specific desired color can be easily ascertained by persons skilled in the art.

The thermoplastic resin compositions of this invention can be prepared by simply melt blending the PET with the polyolefin and optionally a heat stabilizer and/or a colorant. This blending is generally done in the extruder used in making the cellular sheet. However, it can be done in a separate mixing step. Such melt blending is done at a temperature at which the PET is in the liquid state. PET homopolymer has a melting point of about 260° C. Since such a melt blending procedure must be carried out above the melting point of the PET, it will normally be done at a temperature within the range of about 260° C. to 350° C. Normally, it is preferred for the melt blending procedure to be carried out at a temperature within the range of about 280° C. to 320° C. In such a melt blending procedure, the polyolefin is simply dispersed throughout the molten PET. Sufficient mixing action will be applied so as to result in the formation of a homogeneous system. In other words, the polyolefin heat stabilizer and/or colorants added should be uniformly dispersed throughout the PET in order to produce optimal thermoplastic resin compositions. Such a melt blending procedure can commercially be carried out in extruders which provide sufficient shearing forces so as to result in adequate mixing.

After the thermoplastic resin compositions of this invention have been prepared, they can be utilized in the process of this invention. Such thermoplastic resin compositions have particular value for use as thermoforming compositions from which thin walled articles such as dual-ovenable trays can be made. Such thin walled articles have a wall thicknesses of less than about 1 mm.

In practicing the process of this invention cellular sheet is made utilizing the thermoplastic resin composition. Such cellular sheeting is made by mixing at least one inert gas with molten thermoplastic resin composition in an extruder. This is done by simply injecting the inert gas into the molten resin in the extruder which is equipped with a sheet forming die. The inert gas used in this process can be any gas which does not chemically react with the thermoplastic resin composition at the elevated processing temperatures required. Some representative examples of inert gases which can be used include nitrogen, carbon dioxide, helium, neon, argon, and krypton. For purposes of cost savings, nitrogen will normally be used as the inert gas.

The cellular sheet can be made with either a plasticating extruder or a melt extruder. Screw extruders of these type push the molten thermoplastic resin composition containing discreet cells of the inert gas through a metal die that continuously shapes the sheet into the desired form. In most cases, single screw extruders will be utilized. However, in some cases it may be desirable to utilize twin screw extruders or multiple screw extruders which perform essentially the same function.

In most cases it will be convenient to employ a plasticating extruder of the single screw design. The thermoplastic resin composition is fed into such a plasticating extruder by gravitational flow from a hopper into the screw channel. The thermoplastic resin composition fed into the plasticating extruder is initially in particulate solid form. The thermoplastic resin composition initially enters the solid conveying zone of the plasticating extruder. In the solid conveying zone, the solid resin is conveyed and compressed by a drag induced mechanism. In the solid conveying zone, the resin is mixed, heated, and conveyed through the extruder toward the melting zone. This heating is provided by maintaining the barrel of the extruder at an elevated temperature. The barrel of the extruder is typically heated electrically or by a fluid heat exchanger system. Thermocouples are also normally placed in the metal barrel wall to record and to help control barrel temperature settings.

Melting occurs in the melting zone after the resin is heated to a temperature which is above its melting point. In the melting zone, melting, pumping and mixing simultaneously occur. The molten resin is conveyed from the melting zone to the melt conveying zone. The inert gas is injected into the molten resin in the melt conveying zone. In the melt conveying zone, pumping and mixing simultaneously occur. The molten resin in the melt conveying zone is maintained at a temperature which is well above its melting point. A sufficient amount of agitation is provided so as to result in an essentially homogeneous dispersion of inert gas bubbles throughout the molten resin. The molten resin entering the melt conveying zone from the melting zone is at a somewhat lower temperature and accordingly is of a higher viscosity. This essentially prevents the inert gas from back mixing through the extruder and escaping from the solid conveying zone via the hopper.

The molten thermoplastic resin composition in the melt conveying zone is typically pumped into a metering pump and finally extruded through a sheet forming die. The metering pump and sheeting die are typically maintained at a lower temperature than that of the barrel surrounding the melt conveying zone to minimize rupture and diffusion of inert gas bubbles in the thermoplastic resin composition. The sheeting die is of a more or less rectangular design which is quite wide and of a small opening. Upon exiting the sheeting die, the sheet extrudate will swell to a level which is dependent upon the melt temperature, the die length-to-opening ratio, and the shear stress at the die walls. In some cases, such as in the manufacture of clam shells, it is desirable to use a circular die and to extrude a tube which can be slit open and thermoformed. The cellular sheet produced is typically cooled without stretching by convected cold air or an inert gas, by immersion into a fluid bath, or by passage over chilled rolls. The cellular sheet produced is generally amorphous in nature.

The cellular sheet will typically contain a sufficient amount of inert gas cells to provide it with a density which is within the range of about 0.4 to about 1.25. In most cases, the cellular sheet will contain a quantity of inert gas cells to provide it with a density which is within the range of 0.7 to 1.15. It is generally preferred for the cellular sheet to have a density which is within the range of about 0.9 to about 1.1.

The cellular sheet can be thermoformed into heat-set, thin walled articles utilizing conventional thermoforming equipment. Such a thermoforming technique involves the steps of:

1. Preheating the substantially amorphous cellular sheet until it softens and positioning it over the mold.
2. Drawing the preheated sheet onto the heated mold surface.
3. Heatsetting the formed sheet by maintaining sheet contact against the heated mold for a sufficient time period to partially crystallize the sheet.
4. Removing the part out of the mold cavity.

The term substantially amorphous as used herein shall mean a sheet having a level of crystallinity low enough to enable thermoforming of the sheet to be accomplished with satisfactory mold definition and part formation. In currently available thermoforming processes, the level of crystallinity of the preformed sheet should not exceed about 10 percent.

The preheating of the substantially amorphous cellular sheet prior to positioning over the thermoforming mold is necessary in order to achieve the very short molding times required for a viable commercial process. The sheet must be heated above its Tg and below the point at which it sags excessively during positioning over the mold cavity. In the thermoforming process, a sheet temperature which is within the range of about 130° C. to about 210° C. and a mold temperature which is within the range of about 140° C. to about 220° C. will normally be utilized. It is often preferred to use a sheet temperature which is within the range of about 155° C. to about 185° C. and a mold temperature which is within the range of about 165° C. to about 195° C.

This invention can be practiced by using any of the known thermoforming methods including vacuum assist, air assist, mechanical plug assist or matched mold. The mold should be preheated to a temperature sufficient to achieve the degree of crystallinity desired. Selection of the optimum mold temperature is dependent upon the type of thermoforming equipment, configuration and wall thickness of the article being molded and other factors.

Heatsetting is a term describing the process of thermally inducing partial crystallization of a polyester article without appreciable orientation being present. In the practice of this invention, heatsetting is achieved by maintaining intimate contact of the cellular sheet with the heated mold surface for a sufficient time to achieve a level of crystallinity which gives adequate physical properties to the finished part. It has been found that desirable levels of crystallinity should be about 5 to about 45 percent. For containers to be used in high temperature food application, a level of crystallinity above 15 percent is necessary for adequate dimensional stability during demolding operations. A preferred range of crystallinity is from 25 to 35 percent, this range yields parts with excellent dimensional stability and impact resistance.

The heat set part can be removed from the mold cavity by known means. One method, blow back, involves breaking the vacuum established between the mold and the formed sheet by the introduction of compressed air. In commercial thermoforming operation, the part is subsequently trimmed and the scrap ground and recycled.

Since a partially crystalline finished article is necessary for good dimensional stability at high temperatures, knowledge of the degree of crystallinity or percent of crystallinity is of considerable importance. Because articles made by the process of this invention are cellular density measurements cannot be used to determined crystallinity. The crystallinity of the polymer in such article will normally be measured by x-ray diffraction.

The terms crystallization temperature and crystallization onset are used interchangeably to mean the temperature or temperature range in which a regularly repeating morphology, brought about by a combination of molecular mobility and secondary bonding forces, is induced in a polymer over a molecular distance of at least several hundred angstroms. The crystallization temperature or crystallization onset can be visually observed as the point at which a substantially amorphous, unoriented sheet of PET/polyolefin changes from a translucent, hazy appearance to a white appearance.

As used throughout this specification and the appended claims, the term glass transition temperature means that temperature or temperature range at which a change in slope appears in the volume versus temperature curve for said polymer and defining a temperature region below which the polymer exhibits a glassy characteristic and above which the polymer exhibits a rubbery characteristic. The glass transition temperature (Tg) of polyethylene terephthalate is about 70° C.

This invention is illustrated by the following examples which are merely for the purpose of illustration and are not to be regarded as limiting the scope of the invention or the manner in which it can practiced. Unless specifically indicated otherwise, all parts and percentages are given by weight.

EXAMPLE 1

A polyethylene terephthalate resin having an intrinsic viscosity of about 0.95 dl/g (Goodyear Traytuf ® 9506) was blended with linear low density polyethylene and Ethanox TM 330 (a stabilizer). The thermoplastic resin composition made contained about 97% polyethylene terephthalate, about 3 weight percent linear low density polyethylene, and about 0.6% of the stabilizer. The resin was extruded utilizing a 2.5 inch (6.35 cm) Egan extruder which was operated utilizing a barrel temperature which ranged between about 280° C. and about 330° C. An extruder speed of 70 rpm was utilized with the temperature at the metering pump being maintained at about 275° C. The temperature of the die was maintained at about 260° C. Nitrogen gas was vented into the extruder at a pressure of 3,200 psi ($2.2 \times 10^7$ pascals). The cellular sheet produced was 0.03 inches (0.076 cm) thick and had a density of about 1.0 g/cc which represents a density reduction of 24%.

The sheeting prepared was thermoformed into trays utilizing a standard thermoformer. The thermoforming process was carried out utilizing a preheat oven time of about 15 seconds, a mold time of 8 to 10 seconds, a sheet temperature of 154° C., a mold temperature of 154° to 136° C., a top oven temperature of 299° C, and a bottom oven temperature of 116° C. The trays made utilizing this process were very satisfactory. They were determined to have a density of 0.85 g/cc. This represents a 37% reduction in density over solid trays which are made utilizing the same thermoplastic resin composition. The trays prepared in this experiment were also determined to have an impact strength of $1.3 \times 10^4$ g-cm. The trays made were also determined to have satisfactory sag resistance at 200° C. and 240° C. In fact, the sag resistance of the cellular trays produced was approximately the same as the sag resistance of solid trays made utilizing the same thermoplastic resin composition.

It should be noted that the density of the trays produced was 15% less than the density of the cellular sheets. This further reduction in density is due to the expansion of nitrogen cells during the thermoforming process. It is typical for the thermoformed article being produced to have a density which is from about 8% to about 25% less than the density of the cellular sheet. It is more typical for the density of the cellular thermoformed article to be from about 10% to about 20% less than the density of the cellular sheet from which it is made.

The trays made were determined to be heat stable up to 400° F. (204° C.) and are dual-ovenable. Thus, the process of this invention can be used to produce light weight cellular dual-ovenable trays for utilization by the frozen prepared food industry. The process of this invention can, of course, also be used in making clam shells, trays, lids and cups for use by the food services industry. Food containers, such as clam shells made by the process of this invention offer advantages in that they are microwaveable and do not present environmental problems, are recyclable, and meet all FDA regulations.

While certain representative embodiments and details have been shown for the purpose of illustrating the subject invention, it will be apparent to those skilled in this art that various changes and modifications can be made without departing from the scope of this invention.

What is claimed is:

1. A process for making a lightweight thin walled article which comprises: thermoforming a substantially amorphous cellular sheet which is comprised of (a) from about 94 to about 99 weight percent polyethylene terephthalate, (b) from about 1 to about 6 weight percent of at least one polyolefin, (c) a sufficient amount of inert gas cells which are made by injecting inert gas to provide the cellular sheet with a density which is within the range of about 0.4 to about 1.25, (d) optionally, a heat stabilizer and (e) optionally, a colorant.

2. A process for making an amorphous cellular sheet which can be thermoformed into lightweight thin walled articles which comprises: (1) feeding a thermoplastic resin composition into an extruder; wherein the thermoplastic resin composition is comprised of (a) from about 94 to about 99 weight percent polyethylene terephthalate, and (b) from about 1 to about 6 weight percent of at least one polyolefin: (2) mixing an inert gas into the thermoplastic resin composition while the thermoplastic resin composition is in the molten state: and (3) extruding the thermoplastic resin composition containing the inert gas through a sheet forming die to produce a substantially amorphous cellular sheet which contains a sufficient amount of inert gas cells to provide the cellular sheet with a density which is within the range of about 0.4 to about 1.25.

3. A process for making a lightweight article which comprises: (1) feeding a thermoplastic resin composition into an extruder, wherein the thermoplastic resin composition is comprised of (a) from about 94 to about 99 weight percent polyethylene terephthalate, and (b) from about 1 to about 6 weight percent of at least one polyolefin; (2) mixing an inert gas into the thermoplastic resin composition in the extruder while the thermoplastic resin composition is in the molten state: (3) extruding the thermoplastic resin composition containing the inert gas through a sheet forming die to produce a substantially amorphous cellular sheet which contains a sufficient amount of inert gas cells to provide the cellular sheet with a density which is within the range of about 0.4 to about 1.25: and (4) thermoforming the cellular sheet in a heated mold to produce the lightweight article.

4. A process as specified in claim 1 wherein the substantially amorphous cellular sheet contains an effective amount of a heat stabilizer.

5. A process as specified in claim 2 wherein the thermoplastic resin composition is further comprised of an effective amount of a heat stabilizer.

6. A process as specified in claim 3 wherein said thermoplastic resin composition is further comprised of an effective amount of a heat stabilizer.

7. A process as specified in claim 4 wherein the polyethylene terephthalate has an intrinsic viscosity of at least 0.7 dl/g.

8. A process as specified in claim 5 wherein the polyethylene terephthalate has an intrinsic viscosity of at least 0.7 dl/g.

9. A process as specified in claim 6 wherein the polyethylene terephthalate has an intrinsic viscosity of at least 0.7 dl/g.

10. A process as specified in claim 7 wherein a sufficient amount of inert gas cells are present to provide the cellular sheet with a density which is within the range of about 0.7 to about 1.15.

11. A process as specified in claim 8 wherein the cellular sheet has a density which is within the range of about 0.7 to about 1.15.

12. A process as specified in claim 9 wherein the cellular sheet has a density which is within the range of about 0.7 to about 1.15.

13. A process as specified in claim 10 wherein the polyolefin is linear low density polyethylene.

14. A process as specified in claim 11 wherein the polyolefin is linear low density polyethylene.

15. A process as specified in claim 12 wherein the polyolefin is linear low density polyethylene.

16. A process as specified in claim 1 wherein the thermoforming is carried out in a heated mold for a time which is sufficient to achieve a crystallinity in said article which is within the range of about 5% to about 45%.

17. A process as specified in claim 10 wherein the polyolefin in a polyethylene ionomer.

18. A process as specified in claim 11 wherein the polyolefin is a polyethylene ionomer.

19. A process as specified in claim 12 wherein the polyolefin is a polyethylene ionomer.

* * * * *